May 15, 1956 — O. K. OLSEN — 2,745,219
PLANT SUPPORT

Filed Feb. 27, 1953 — 2 Sheets-Sheet 1

INVENTOR.
Ole Knud Olsen

May 15, 1956  O. K. OLSEN  2,745,219
PLANT SUPPORT
Filed Feb. 27, 1953  2 Sheets-Sheet 2
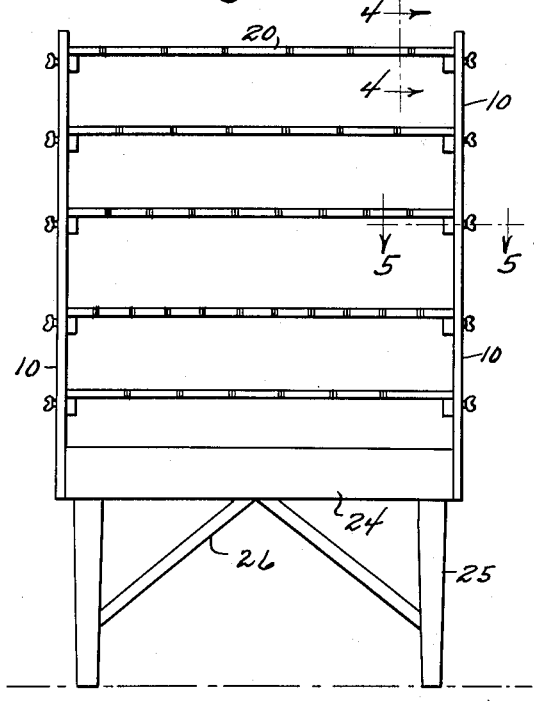
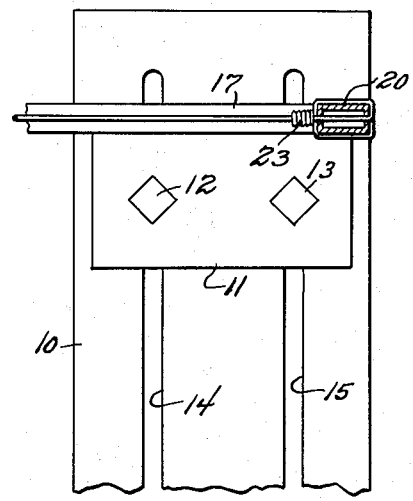
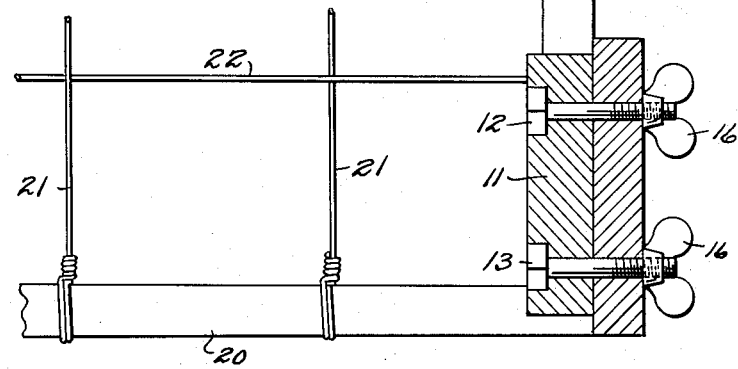
INVENTOR.
Ole Knud Olsen
BY Victor J. Evans & Co.
ATTORNEYS United States Patent Office 2,745,219
Patented May 15, 1956

2,745,219

PLANT SUPPORT

Ole Knud Olsen, Beloit, Wis.

Application February 27, 1953, Serial No. 339,366

1 Claim. (Cl. 47—47)

This invention relates to devices for retaining plants in vertically disposed positions where plants, such as chrysanthemums include a single stem with a blossom on the upper end, and in particular a plant supporting structure or bench, rectangular shaped in plan having posts at the corners with spaced parallel slots therein and blocks adapted to be clamped to the posts for adjustably supporting horizontally disposed frames having transverse and longitudinally disposed strands therein.

The purpose of this invention is to provide supporting means for plants wherein the stems of the plants are supported continuously at spaced intervals and wherein frames are adapted to be added as the growth of the plants continues.

Various attempts have been made to support plants having long stems, such as chrysanthemums at different points throughout the length of the stems, however, it is difficult to move the supporting elements upwardly as the growth of the plant continues, and it is also difficult to add additional supporting elements as the blooms develop on the upper ends of the stems. With this thought in mind this invention contemplates a bench adapted to hold a plurality of plants with vertically disposed posts at the corners and with horizontally disposed frames covered with wire mesh spaced to correspond with the type of plant adjustably mounted on the posts and providing means for supporting the plants as the stems of the plants continue to grow upwardly.

The object of this invention is, therefore, to provide a plant supporting structure wherein stems of plants are independently held and wherein additional supporting elements are added as growth of the plants continue.

Another object of the invention is to provide a plant supporting structure in which the supporting elements are readily adjusted and in which openings in the supporting elements may be provided to correspond with the type of plant.

A further object of the invention is to provide a plant supporting structure including a plurality of superimposed frames in which the device is of a comparatively simple and economical construction.

With these and other objects and advantages in view the invention embodies a bench bar providing posts and having substantially continuous parallel slots therein mounted on the corners of the bench, blocks having bolts therein positioned with the bolts extended through the slots of the posts and having wing nuts threaded on the ends of the bolts, and rectangular shaped frames having sides and end members with transversely and also longitudinally disposed strands extended through the intermediate parts thereof.

Other features and advantages of the invention will appear from the following description taken in connection with the drawing, wherein:

Figure 3 is an end elevational view of the support.

Figure 4 is a detail with the parts shown on an enlarged scale showing a section taken on line 4—4 of Fig. 3 and illustrating one of the supporting blocks positioned under the corner of one of the horizontally disposed frames.

Figure 5 is a sectional plan taken on line 5—5 of Fig. 3 also with the parts shown on an enlarged scale and showing one of the clamping blocks attached to a corner post.

Figure 1:
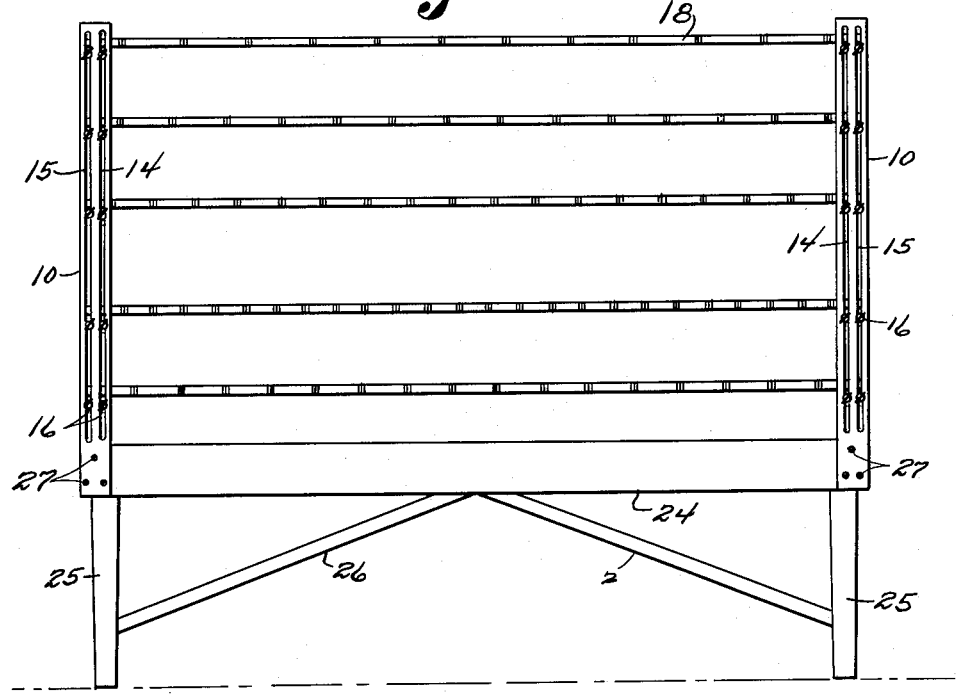
Figure 1 is a side elevational view illustrating the improved plant support.
Figure 2:
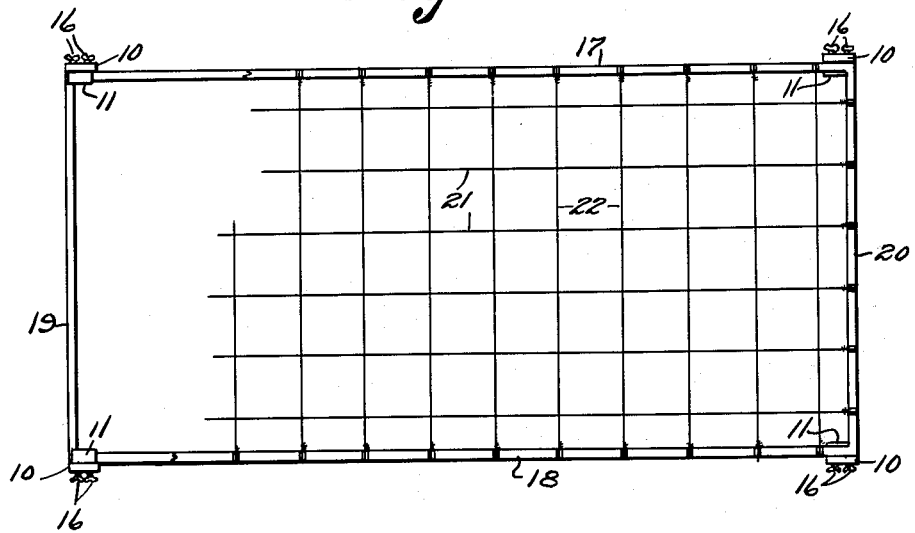
Figure 2 is a plan view of the improved plant support.

Referring now to the drawings wherein like reference characters denote corresponding parts the improved plant support of this invention includes a plurality of corner posts 10 adapted to be mounted on a bench, clamping blocks 11 adapted to be adjustably positioned on the corner posts with clamp bolts 12 and 13 extended through slots 14 and 15 in the corner posts and having wing or thumb nuts 16 on the extended ends, and substantially rectangular-shaped frames having side rails 17 and 18 connected with end rails 19 and 20 and having transversely disposed strands 21 extended from one side rail to another and longitudinally disposed strands 22 extended from one end rail to another.

The side and end rails of the frames are preferably formed of relatively thin tubular stock, as shown in Fig. 4 with the rails secured together at the corners, preferably by welding and the transverse and longitudinal elements 21 and 22 are secured to the rails, by wrapping the ends around the rails and twisting the ends as shown at the point 23 in Fig. 5. It will be understood, however, that the transverse and longitudinal members may be secured to the rails by other suitable means and the spacing between the transverse and longitudinal members may be varied to compensate for the type of plant supported by the frame.

In the design shown the plant support is mounted upon a bench 24 supported by legs 25 with braces 26 and the corner posts are secured by fasteners 27 extended through openings in the lower ends of the posts and into the upper member 24 of the bench.

With the parts arranged in this manner the posts which are preferably formed of thin wall conduit are secured, preferably by bolts, to the top of the bench and the blocks 11 are clamped in position on the inner surfaces of the posts whereby supports for the frames are provided at the four corners and the frames are freely positioned on the blocks.

As the growth of the plants continues additional blocks are added and additional frames are placed on the added blocks, as shown in Figs. 1 and 3.

It will be understood that modifications, within the scope of the appended claim, may be made in the design and arrangement of the parts without departing from the spirit of the invention.

What is claimed is:

In a plant support, a bench including a horizontally disposed tray, a plurality of vertically disposed legs for supporting said tray, inclined braces extending between said legs and tray, a plurality of vertically disposed spaced parallel posts extending upwardly from the corners of said tray and secured thereto, each of said posts being provided with a pair of spaced parallel longitudinally extending slots, clamping blocks arranged contiguous to the inner surfaces of said posts, said blocks adapted to be adjusted vertically along said posts, each of said blocks being provided with a pair of openings registering with the slots in said posts, there being countersunk recesses in said blocks communicating with said openings, securing elements extending through said registering openings and slots for detachably connecting said blocks to said posts and said securing elements having heads thereon seated in said countersunk recesses, a plurality of rectangular frames each including spaced parallel side rails and spaced parallel end rails, said side and end rails being secured together, a first set of spaced, parallel horizontally disposed strands extending between said side rails and secured thereto, and a second set of spaced, parallel strands extending between said end rails and secured thereto, said second strands coacting with said first strands to define rectangular areas therebetween, said rails being hollow and said rails being each provided with a plurality of spaced apertures for the projection therethrough of portions of said strands, said frames being freely positioned on said blocks.

References Cited in the file of this patent

UNITED STATES PATENTS

| | | |
|---|---|---|
| 948,620 | Wait | Feb. 8, 1910 |
| 949,239 | Lozier | Feb. 15, 1910 |
| 1,980,239 | Vetter | Nov. 13, 1934 |
| 2,458,931 | Conklin | Jan. 11, 1949 |
| 2,571,483 | Pope | Oct. 16, 1951 |